US012455193B2

United States Patent
Nguyen et al.

(10) Patent No.: US 12,455,193 B2
(45) Date of Patent: Oct. 28, 2025

(54) VARIABLE SENSITIVITY IN INFRARED IMAGING SYSTEMS AND METHODS

(71) Applicant: FLIR Systems AB, Täby (SE)

(72) Inventors: Tien C. Nguyen, Täby (SE); Henning Hagman, Täby (SE)

(73) Assignee: FLIR Systems AB, Täby (SE)

( * ) Notice: Subject to any disclaimer, the term of this patent is extended or adjusted under 35 U.S.C. 154(b) by 624 days.

(21) Appl. No.: 17/890,120

(22) Filed: Aug. 17, 2022

(65) Prior Publication Data

US 2023/0069029 A1 Mar. 2, 2023

Related U.S. Application Data

(60) Provisional application No. 63/237,103, filed on Aug. 25, 2021.

(51) Int. Cl.
*G01J 5/00* (2022.01)
*G06T 5/50* (2006.01)
*G06V 10/25* (2022.01)
*G06V 10/98* (2022.01)

(52) U.S. Cl.
CPC ........ *G01J 5/00* (2013.01); *G06T 5/50* (2013.01); *G06V 10/25* (2022.01); *G06V 10/98* (2022.01); *G01J 2005/0077* (2013.01); *G06T 2207/10048* (2013.01); *G06T 2207/20221* (2013.01)

(58) Field of Classification Search
CPC ............ G01J 5/00; G06V 10/25; G06V 10/98
See application file for complete search history.

(56) References Cited

U.S. PATENT DOCUMENTS

| 6,515,285 B1* | 2/2003 | Marshall | H01L 25/042 250/339.04 |
|---|---|---|---|
| 10,416,076 B2 | 9/2019 | Sandsten et al. | |
| 2005/0029453 A1* | 2/2005 | Allen | H04N 25/76 250/332 |
| 2005/0205785 A1* | 9/2005 | Hornback | H04N 25/671 348/E5.081 |
| 2007/0290868 A1* | 12/2007 | Manning | G08B 13/19 340/567 |
| 2009/0121139 A1* | 5/2009 | Chamming'S | H04N 25/671 250/340 |

(Continued)

OTHER PUBLICATIONS

FLIR Systems, Inc., "FLIR X6581sc", FLIR X6581sc Data Sheet, Jun. 26, 2017, 5 pages, FLIR Systems, Inc., Wilsonville, Oregon, United States of America.

(Continued)

*Primary Examiner* — Hugh Maupin
(74) *Attorney, Agent, or Firm* — Haynes and Boone, LLP

(57) ABSTRACT

Techniques are provided for variable sensitivity in infrared imaging. In one example, an infrared imaging system includes an infrared imager and a logic device. The infrared imager is configured to capture a first infrared image of a scene using a sensitivity setting. The logic device is configured to determine a temperature associated with the scene based on a second infrared image of the scene. The logic device is further configured to determine the sensitivity setting based on an ambient temperature associated with the infrared imager and the temperature associated with the scene. Related devices and methods are also provided.

20 Claims, 5 Drawing Sheets

(56) References Cited

U.S. PATENT DOCUMENTS

| | | | | |
|---|---|---|---|---|
| 2010/0211333 A1* | 8/2010 | Pruet | ............... | G01J 3/027 |
| | | | | 356/519 |
| 2010/0288915 A1* | 11/2010 | Endo | ............... | G01J 5/20 |
| | | | | 250/252.1 |
| 2010/0294933 A1* | 11/2010 | Stratmann | ............... | H04N 23/23 |
| | | | | 250/338.3 |
| 2013/0248711 A1* | 9/2013 | Lambkin | ............... | H10F 39/184 |
| | | | | 250/340 |
| 2014/0184805 A1* | 7/2014 | Schmidt | ............... | H04N 23/23 |
| | | | | 348/164 |
| 2014/0239180 A1* | 8/2014 | Vilain | ............... | H04N 23/23 |
| | | | | 250/338.4 |
| 2015/0085134 A1* | 3/2015 | Novotny | ............... | H04N 25/533 |
| | | | | 348/164 |
| 2017/0045443 A1* | 2/2017 | Wang | ............... | G01N 21/3504 |
| 2018/0003689 A1* | 1/2018 | Shelton | ............... | G01N 21/3563 |
| 2019/0187019 A1 | 6/2019 | Ekeroth | | |
| 2020/0116583 A1 | 4/2020 | Hedberg | | |
| 2020/0200608 A1* | 6/2020 | Williams | ............... | G01J 5/53 |
| 2021/0344851 A1* | 11/2021 | Kester | ............... | G01J 3/0208 |

OTHER PUBLICATIONS

Zhou Li et al., "High-efficiency non-uniformity correction for wide dynamic linear infrared radiometry system", Abstract, Infrared Physics & Technology, Sep. 2017, 7 pages, vol. 85, Elsevier B.V., Amsterdam, Netherlands.

Li Hua-Cai et al., "A Wide Dynamic Range NUC Algorithm for IRCS Systems;" Abstract, Journal of the Korean Physical Society, Dec. 29, 2018, 8 pages, vol. 73, Springer Batur.

FLIR Systems, Inc., "FLIR GF77", FLIR GF77 Datasheet, Sep. 1, 2020, 2 pages, FLIR Systems, Inc., Wilsonville, Oregon, United States of America.

\* cited by examiner

VARIABLE SENSITIVITY IN INFRARED IMAGING SYSTEMS AND METHODS

CROSS REFERENCE TO RELATED APPLICATIONS

This application claims priority to and the benefit of U.S. Provisional Application No. 63/237,103 filed Aug. 25, 2021 and entitled "Variable Sensitivity In Infrared Imaging Systems And Methods," which is incorporated herein by reference in its entirety.

TECHNICAL FIELD

One or more embodiments relate generally to imaging and more particularly, for example, to variable sensitivity in infrared imaging systems and methods.

BACKGROUND

Imaging systems may include an array of detectors arranged in rows and columns, with each detector functioning as a pixel to produce a portion of a two-dimensional image. For example, an individual detector of the array of detectors captures an associated pixel value. There are a wide variety of image detectors, such as visible-light image detectors, infrared image detectors, or other types of image detectors that may be provided in an image detector array for capturing an image. As an example, a plurality of sensors may be provided in an image detector array to detect electromagnetic (EM) radiation at desired wavelengths. In some cases, such as for infrared imaging, readout of image data captured by the detectors may be performed in a time-multiplexed manner by a readout integrated circuit (ROIC). The image data that is read out may be communicated to other circuitry, such as for processing, storage, and/or display. In some cases, a combination of a detector array and an ROIC may be referred to as a focal plane array (FPA). Advances in process technology for FPAs and image processing have led to increased capabilities and sophistication of resulting imaging systems.

SUMMARY

In one or more embodiments, an infrared imaging system includes an infrared imager and a logic device. The infrared imager is configured to capture a first infrared image of a scene using a sensitivity setting. The logic device is configured to determine a temperature associated with the scene based on a second infrared image of the scene. The logic device is further configured to determine the sensitivity setting based on an ambient temperature associated with the infrared imager and the temperature associated with the scene.

In one or more embodiments, a method includes determining a temperature associated with a scene based on a first infrared image of the scene. The method further includes determining a sensitivity setting based on an ambient temperature associated with an infrared imager and the temperature associated with the scene. The method further includes capturing, by the infrared imager, a second infrared image of the scene using the sensitivity setting.

The scope of the present disclosure is defined by the claims, which are incorporated into this section by reference. A more complete understanding of embodiments of the present disclosure will be afforded to those skilled in the art, as well as a realization of additional advantages thereof, by a consideration of the following detailed description of one or more embodiments. Reference will be made to the appended sheets of drawings that will first be described briefly.

Figure 1:
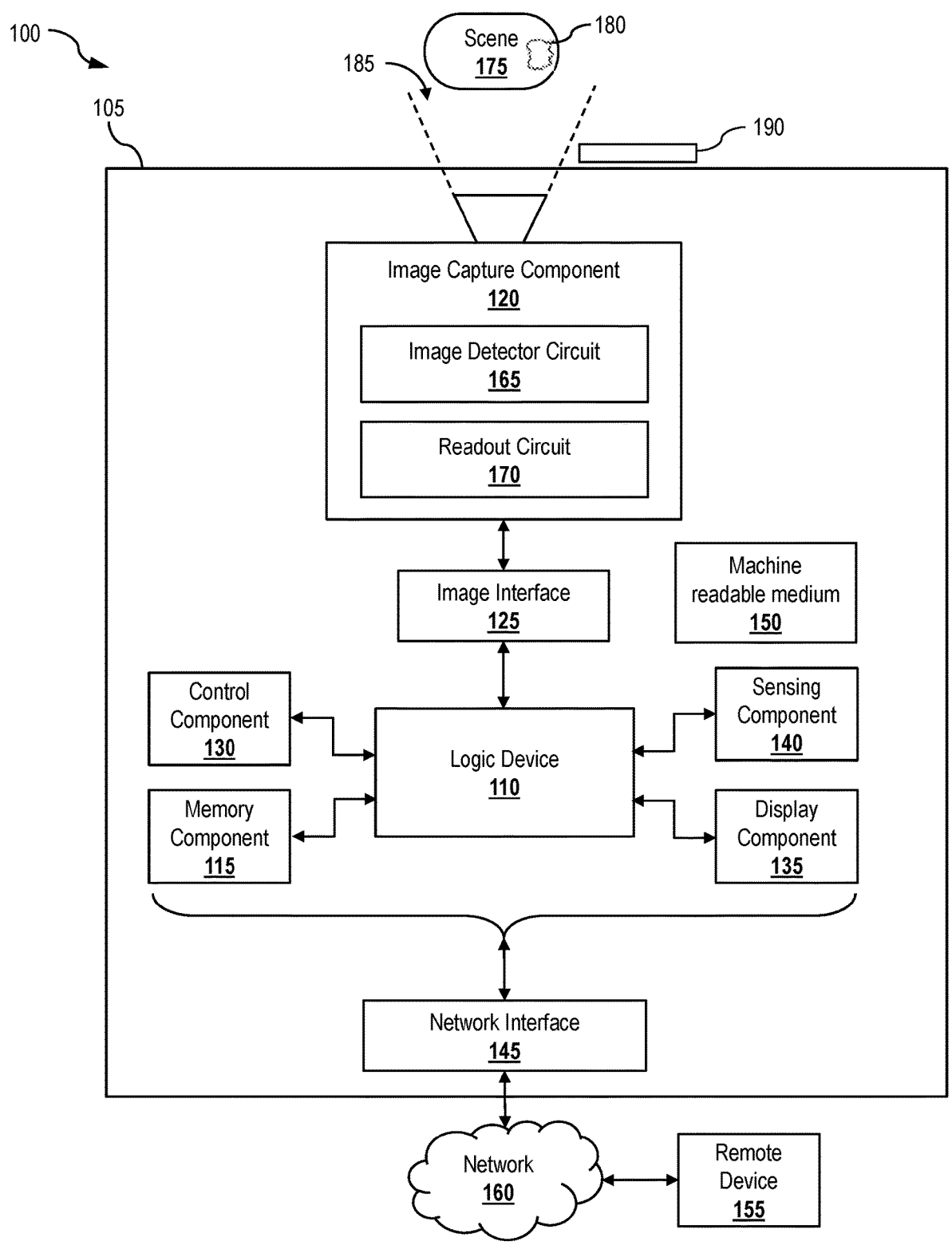
FIG. 1 illustrates a block diagram of an example imaging system in accordance with one or more embodiments of the present disclosure.

Embodiments of the present disclosure and their advantages are best understood by referring to the detailed description that follows. It is noted that sizes of various components and distances between these components are not drawn to scale in the figures. It should be appreciated that like reference numerals are used to identify like elements illustrated in one or more of the figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more embodiments. In one or more instances, structures and components are shown in block diagram form in order to avoid obscuring the concepts of the subject technology. One or more embodiments of the subject disclosure are illustrated by and/or described in connection with one or more figures and are set forth in the claims.

Various techniques provide variable sensitivity in infrared imaging systems and methods. An infrared imaging system (e.g., a thermal camera) may be used to capture infrared image data associated with a scene using an image sensor device (e.g., a detector array of an FPA). The image sensor device includes detectors (e.g., also referred to as detector pixels, detector elements, or simply pixels). The image sensor device may be implemented with uncooled detector technology or cooled detector technology. Each detector pixel may detect incident EM radiation and generate infrared image data indicative of the detected EM radiation of the scene. In some embodiments, the image sensor array is used to detect infrared radiation (e.g., thermal infrared radiation). The detector pixels may be used to measure temperatures of the scene using calibrated data that correlates infrared radiation (e.g., infrared energy fluxes) detected by the detector pixels in the scene with corresponding temperatures. In this regard, for pixels of an infrared image (e.g., thermal infrared image), each output value of a pixel may be represented/provided as and/or correspond to a temperature, digital count value, percentage of a full temperature range, or generally any value that can be mapped to the temperature. For example, a digital count value of 13,000 output by a pixel may represent a temperature of 160° C. As such, the captured infrared image data may indicate or may be used to determine a temperature of objects, persons, and/or other features/aspects in the scene.

The sensitivity of the infrared imaging system (e.g., an uncooled thermal camera) may be determined based on an ambient temperature and a scene temperature. In this regard, for varying scene temperatures and/or ambient temperatures, the sensitivity of detectors (e.g., microbolometers) of the infrared imaging system may vary, thus affecting image quality. In an aspect, the sensitivity of detectors may be adjusted by adjusting one or more image capture parameters (e.g., also referred to as sensitivity adjustment parameters or sensitivity setting parameters). Image capture parameters are generally dependent on detector technology. By way of non-limiting examples, image capture parameters associated with microbolometers may include an integration time, a capacitance, and a bias voltage. In some cases, the sensitivity of any given detector may provide, or may be indicative of, the smallest temperature difference that may be measured by the detector and may be referred to as a temperature sensitivity or a temperature resolution. In some cases, the sensitivity may be expressed as noise equivalent delta temperature (NEDT), which provides the smallest temperature change that can be measured by the infrared imaging system (e.g., the smallest temperature change that the infrared imaging system can detect above its noise floor). For the same scene temperature, a dynamic range may vary depending on detector temperature. The dynamic range may provide a range (e.g., difference) between the minimum temperature and the maximum temperature that can be captured by the image sensor device and represented in an infrared image. In this regard, setting of image capture parameters may involve tradeoffs between sensitivity and dynamic range.

The ambient temperature may refer to an air temperature surrounding the infrared imaging system. In some cases, the ambient temperature may refer to the detector temperature (e.g., substrate temperature) associated with the detectors of the infrared imaging system. In this regard, for various detector technologies, such as microbolometer technology (e.g., non-thermally regulated microbolometers), the detector temperature follows the ambient temperature and thus the terms detector temperature and ambient temperature may be used interchangeably. Detector sensitivity directly relates to the span of object temperatures that can be imaged by the detector, also referred to as a scene temperature. Different objects/portions of a scene may have different temperatures, in which case the scene may be associated with multiple scene temperatures.

To facilitate achieving/implementing a desired sensitivity, the infrared imaging system may utilize (e.g., perform computations using) equations, lookup tables, and/or generally any representations of relationships/correlations between one or more image capture parameters, the temperature data (e.g., the ambient temperature, the scene temperature, or both), and the desired sensitivity. Such equations, lookup tables, and/or other representations may be determined and adjusted during calibration (e.g., factory calibration and/or in-the-field calibration) of the image sensor device and/or based on received user input, and may be stored in memory of the infrared imaging system and/or otherwise accessible to the infrared imaging system. As an example of user input, a user(s) of the infrared imaging system may manually adjust certain settings and parameters, such as adjusting the integration time, to achieve improved imaging performance (e.g., based on user-specific and/or application-specific performance criteria). Such user input may cause an adjustment (e.g., a tuning) of the equations, lookup tables, and/or other representations of relationships/correlations between the image capture parameter(s), the temperature data, and the desired sensitivity.

In general, an ability to resolve small temperature differences is in contrast with an ability to image large differences in scene temperature. The sensitivity of the infrared imaging system may be adjusted (e.g., maximized) based on ambient temperature and/or scene temperature. In some aspects, such sensitivity adjustments may allow high image quality while maintaining radiometric performance (e.g., measurement accuracy). In some cases, the radiometric performance may be maintained by adjusting radiometry correction maps/terms. Such radiometry correction maps/terms may include, by way of non-limiting examples, non-uniformity correction maps/terms, such as gain correction maps/terms and offset correction maps/terms, and temperature stability correction maps/terms. In some cases, updated radiometry correction maps/terms may be determined (e.g., computed) based on the ambient/detector temperature and/or scene temperature (e.g., depending on how the sensitivity is set, such as set based on the ambient temperature, scene temperature, or both).

Thus, using various embodiments, a sensitivity setting of the infrared imaging system (e.g., detectors of the infrared imaging system) may be freely set and associated maps and temperature stability correction terms determined on the fly based on the freely selected sensitivity setting. In this regard, the sensitivity may be adjusted responsive to changes in the ambient temperature and/or the scene temperature. Such adjustment of the sensitivity may be performed continuously (e.g., in substantially real-time), periodically (e.g., set by a user or a manufacturer of the infrared imaging system), in response to a trigger event (e.g., upon detection of a new high temperature object and/or new low temperature object), and/or other triggers. To facilitate accurate temperature measurements, the sensitivity of the infrared imaging system may be adjusted responsive to varying scene temperatures and/or varying ambient temperatures while maintaining radiometry performance (e.g., temperature measurements). In some aspects, the infrared imaging system may allow the user to set the sensitivity manually and/or set the sensitivity autonomously based on the ambient temperature and/or the scene temperature.

Embodiments herein allow sensitivity to be set and correction maps/terms determined on-the-fly based on the sensitivity, in contrast to approaches in which only a set of predetermined sensitivity settings may be set for the infrared imaging systems. Each range/working environment may be associated with a specific sensitivity setting and correction terms/maps for providing image quality and temperature measurement accuracy. With only a set of predetermined sensitivity settings, the number of ranges/working environments that can be calibrated and stored in camera memory is limited. Such limitations may cause the user to use a range broader and/or less sensitive than needed for a given scene temperature.

In some embodiments, the infrared imaging system may provide an optical gas imaging system. The infrared imaging system may be used to provide variable sensitivity to facilitate optical gas imaging. In this regard, the infrared imaging system may be tuned to provide higher sensitivity (e.g., maximum sensitivity) for a particular gas leak within the infrared imaging system's field of view. The infrared imaging system may be a handheld imaging system with an operator or a fixed mount imaging system. In some cases, the infrared imaging system may be a cooled infrared imaging system or an uncooled infrared imaging system. The infrared imaging system may be implemented in applications in which gas detection and gas alarm may be used for decision making.

In some cases, a potential gas leak may be identified by the user by letting the user mark a region of interest (ROI) where the user believes there to be a gas. As an example, the infrared imaging system may allow the user to mark an area directly on an image displayed on the screen (e.g., a touch screen). Alternatively or in addition, the infrared imaging system may identify an ROI using gas detection techniques. Examples of gas detection techniques are provided in U.S. Patent Application Publication Nos. 2019/0187019 and 2020/0116583 and U.S. Pat. No. 10,416,076, which are all incorporated by reference in their entirety.

The infrared imaging system may determine a temperature (e.g., an apparent temperature) of the potential gas within the ROI and determine a temperature range associated with the ROI based on the temperature of the potential gas. The infrared imaging system may determine a sensitivity associated with the temperature range and capture a subsequent image based on the temperature range to facilitate detection, visualization, and/or analysis of the potential gas. The sensitivity may be adjusted by adjusting one or more image capture parameters (e.g., by adjusting the integration time). In some cases, such as for cooled cameras, the infrared imaging system may set/determine an appropriate integration time to achieve the best sensitivity for that temperature range for facilitating gas detection, visualization, and/or analysis. In this regard, the infrared imaging system is tuned to be as sensitive as practically feasible for the gas.

In some cases, complementary functions may enhance gas visibility and spatial awareness to provide the best image to the user or a gas detection algorithm. In this regard, techniques to capture an image according to the temperature range and sensitivity may be combined with different techniques (e.g., combining composite images, different palettes) to increase the likelihood for the user and/or the imaging device (e.g., fixed optical gas imaging devices) to visualize gas leaks. If the entire image is within a temperature range associated with gas visualization that can be captured using a single integration time, the whole image may be considered as a single ROI. If parts of the image are saturated due to the new temperature range, additional temperature ranges may capture images (e.g., consecutive images) with different integration times and a composite image may be generated based on the captured images. In this regard, such saturation may occur for parts of the image outside of the temperature range associated with the gas. If only a single image is used when saturation is present, the spatial awareness may be reduced as the image does not accurately depict the scene. A combination of images captured at different integration times may provide gas visualization with best sensitivity while also providing spatial awareness of the full scene (e.g., by avoiding saturation). In some cases, different colorization palettes may be used to enhance the gas visualization. For pixels in the composite image related to the temperature range tuned for best gas sensitivity, a high contrast color palette may be used, such as rainbow HC. The pixels in the composite image related to the additional temperature ranges used for spatial awareness may utilize a subdued color palette, such as grayscale. Different image enhancement can be used such as high contrast color palettes, differential images (high sensitivity mode), or tuning the level and span of the color palette manually to highlight the gas.

Although various embodiments are described primarily with respect to infrared imaging, methods and systems disclosed herein may be utilized in conjunction with devices and systems such as imaging systems having visible-light and infrared imaging capability, short-wave infrared (SWIR) imaging systems, light detection and ranging (LIDAR) imaging systems, radar detection and ranging (RADAR) imaging systems, millimeter wavelength (MMW) imaging systems, ultrasonic imaging systems, X-ray imaging systems, microscope systems, mobile digital cameras, video surveillance systems, video processing systems, or other systems or devices that may need to obtain image data in one or multiple portions of the EM spectrum.

Referring now to the drawings, FIG. 1 illustrates a block diagram of an example imaging system 100 in accordance with one or more embodiments of the present disclosure. Not all of the depicted components may be required, however, and one or more embodiments may include additional components not shown in the figure. Variations in the arrangement and type of the components may be made without departing from the spirit or scope of the claims as set forth herein. Additional components, different components, and/or fewer components may be provided.

The imaging system 100 may be utilized for capturing and processing images in accordance with an embodiment of the disclosure. The imaging system 100 may represent any type of imaging system that detects one or more ranges (e.g., wavebands) of EM radiation and provides representative data (e.g., one or more still image frames or video image frames). The imaging system 100 may include an imaging device 105. By way of non-limiting examples, the imaging device 105 may be, may include, or may be a part of an infrared camera, a visible-light camera, a tablet computer, a laptop, a personal digital assistant (PDA), a mobile device, a desktop computer, or other electronic device. The imaging device 105 may include a housing (e.g., a camera body) that at least partially encloses components of the imaging device 105, such as to facilitate compactness and protection of the imaging device 105. For example, the solid box labeled 105 in FIG. 1 may represent a housing of the imaging device 105. The housing may contain more, fewer, and/or different components of the imaging device 105 than those depicted within the solid box in FIG. 1. In an embodiment, the imaging system 100 may include a portable device and may be incorporated, for example, into a vehicle or a non-mobile installation requiring images to be stored and/or displayed. The vehicle may be a land-based vehicle (e.g., automobile, truck), a naval-based vehicle, an aerial vehicle (e.g., unmanned aerial vehicle (UAV)), a space vehicle, or generally any type of vehicle that may incorporate (e.g., installed within, mounted thereon, etc.) the imaging system 100. In another example, the imaging system 100 may be coupled to various types of fixed locations (e.g., a home security mount, a campsite or outdoors mount, or other location) via one or more types of mounts.

The imaging device 105 includes, according to one implementation, a logic device 110, a memory component 115, an image capture component 120 (e.g., an imager, an image sensor device), an image interface 125, a control component 130, a display component 135, a sensing component 140, and/or a network interface 145. The logic device 110, according to various embodiments, includes one or more of a processor, a microprocessor, a central processing unit (CPU), a graphics processing unit (GPU), a single-core processor, a multi-core processor, a microcontroller, a programmable logic device (PLD) (e.g., field programmable gate array (FPGA)), an application specific integrated circuit (ASIC), a digital signal processing (DSP) device, or other logic device, one or more memories for storing executable instructions (e.g., software, firmware, or other instructions), and/or or any other appropriate combination of processing device and/or memory to execute instructions to perform any of the various operations described herein. The logic device 110 may be configured, by hardwiring, executing software instructions, or a combination of both, to perform various operations discussed herein for embodiments of the disclosure. The logic device 110 may be configured to interface and communicate with the various other components (e.g., 115, 120, 125, 130, 135, 140, 145, etc.) of the imaging system 100 to perform such operations. For example, the logic device 110 may be configured to process captured image data received from the imaging capture component 120, store the image data in the memory component 115, and/or retrieve stored image data from the memory component 115. In one aspect, the logic device 110 may be configured to perform various system control operations (e.g., to control communications and operations of various components of the imaging system 100) and other image processing operations (e.g., delayering, sharpening, color correction, offset correction, bad pixel replacement, data conversion, data transformation, data compression, video analytics, etc.).

The memory component 115 includes, in one embodiment, one or more memory devices configured to store data and information, including infrared image data and information. The memory component 115 may include one or more various types of memory devices including volatile and non-volatile memory devices, such as random access memory (RAM), dynamic RAM (DRAM), static RAM (SRAM), non-volatile random-access memory (NVRAM), read-only memory (ROM), programmable read-only memory (PROM), erasable programmable read-only memory (EPROM), electrically-erasable programmable read-only memory (EEPROM), flash memory, hard disk drive, and/or other types of memory. As discussed above, the logic device 110 may be configured to execute software instructions stored in the memory component 115 so as to perform method and process steps and/or operations. The logic device 110 and/or the image interface 125 may be configured to store in the memory component 115 images or digital image data captured by the image capture component 120. In some embodiments, the memory component 115 may include non-volatile memory to store various correction maps/terms (e.g., non-uniformity correction maps/terms, temperature stability correction maps/terms) obtained from factory calibration and/or in-the-field calibration.

In some embodiments, a separate machine-readable medium 150 (e.g., a memory, such as a hard drive, a compact disk, a digital video disk, or a flash memory) may store the software instructions and/or configuration data which can be executed or accessed by a computer (e.g., a logic device or processor-based system) to perform various methods and operations, such as methods and operations associated with processing image data. In one aspect, the machine-readable medium 150 may be portable and/or located separate from the imaging device 105, with the stored software instructions and/or data provided to the imaging device 105 by coupling the machine-readable medium 150 to the imaging device 105 and/or by the imaging device 105 downloading (e.g., via a wired link and/or a wireless link) from the machine-readable medium 150. It should be appreciated that various modules may be integrated in software and/or hardware as part of the logic device 110, with code (e.g., software or configuration data) for the modules stored, for example, in the memory component 115.

The imaging device 105 may be a video and/or still camera to capture and process images and/or videos of a scene 175. The scene 175 may include an object 180. In this regard, the image capture component 120 of the imaging device 105 may be configured to capture images (e.g., still and/or video images) of the scene 175 in a particular spectrum or modality. The image capture component 120 includes an image detector circuit 165 (e.g., a visible-light detector circuit, a thermal infrared detector circuit) and a readout circuit 170 (e.g., an ROIC). For example, the image capture component 120 may include an IR imaging sensor (e.g., IR imaging sensor array) configured to detect IR radiation in the near, middle, and/or far IR spectrum and provide IR images (e.g., IR image data or signal) representative of the IR radiation from the scene 175. For example, the image detector circuit 165 may capture (e.g., detect, sense) IR radiation with wavelengths in the range from around 700 nm to around 2 mm, or portion thereof. For example, in some aspects, the image detector circuit 165 may be sensitive to (e.g., better detect) SWIR radiation, mid-wave IR (MWIR) radiation (e.g., EM radiation with wavelength of 2 µm to 5 µm), and/or long-wave IR (LWIR) radiation (e.g., EM radiation with wavelength of 7 µm to 14 µm), or any desired IR wavelengths (e.g., generally in the 0.7 µm to 14 µm range). In other aspects, the image detector circuit 165 may capture radiation from one or more other wavebands of the EM spectrum, such as visible light, ultraviolet light, and so forth.

The image detector circuit 165 may capture image data (e.g., infrared image data) associated with the scene 175. To capture a detector output image, the image detector circuit 165 may detect image data of the scene 175 (e.g., in the form of EM radiation) received through an aperture 185 of the imaging device 105 and generate pixel values of the image based on the scene 175. An image may be referred to as a frame or an image frame. In some cases, the image detector circuit 165 may include an array of detectors (e.g., also referred to as an array of pixels) that can detect radiation of a certain waveband, convert the detected radiation into electrical signals (e.g., voltages, currents, etc.), and generate the pixel values based on the electrical signals. Each detector in the array may capture a respective portion of the image data and generate a pixel value based on the respective portion captured by the detector. The pixel value generated by the detector may be referred to as an output of the detector. By way of non-limiting examples, each detector may be a photodetector, such as an avalanche photodiode, an infrared photodetector, a quantum well infrared photodetector, a microbolometer, or other detector capable of converting EM radiation (e.g., of a certain wavelength) to a pixel value. The array of detectors may be arranged in rows and columns. In an embodiment, the image detector circuit 165 may receive energy flux (e.g., thermal infrared energy flux) from an object(s) in the scene 175 and convert the energy flux to data values indicative of temperatures of the object(s) in the scene 175. The imaging device 105 may be radiometrically calibrated to ensure accurate conversion from the amount of energy received by the image detector circuit 165 to the data values generated by the image detector circuit 165.

The detector output image may be, or may be considered, a data structure that includes pixels and is a representation of the image data associated with the scene 175, with each pixel having a pixel value that represents EM radiation emitted or reflected from a portion of the scene 175 and received by a detector that generates the pixel value. Based on context, a pixel may refer to a detector of the image detector circuit 165 that generates an associated pixel value or a pixel (e.g., pixel location, pixel coordinate) of the detector output image formed from the generated pixel values. In one example, the detector output image may be an infrared image (e.g., thermal infrared image). For a thermal infrared image (e.g., also referred to as a thermal image), each pixel value of the thermal infrared image may represent a temperature of a corresponding portion of the scene 175. In another example, the detector output image may be a visible-light image.

In an aspect, the pixel values generated by the image detector circuit 165 may be represented in terms of digital count values generated based on the electrical signals obtained from converting the detected radiation. For example, in a case that the image detector circuit 165 includes or is otherwise coupled to an analog-to-digital (ADC) circuit, the ADC circuit may generate digital count values based on the electrical signals. For an ADC circuit that can represent an electrical signal using 14 bits, the digital count value may range from 0 to 16,383. In such cases, the pixel value of the detector may be the digital count value output from the ADC circuit. In other cases (e.g., in cases without an ADC circuit), the pixel value may be analog in nature with a value that is, or is indicative of, the value of the electrical signal. As an example, for infrared imaging, a larger amount of IR radiation being incident on and detected by the image detector circuit 165 (e.g., an IR image detector circuit) is associated with higher digital count values and higher temperatures.

The readout circuit 170 may be utilized as an interface between the image detector circuit 165 that detects the image data and the logic device 110 that processes the detected image data as read out by the readout circuit 170, with communication of data from the readout circuit 170 to the logic device 110 facilitated by the image interface 125. An image capturing frame rate may refer to the rate (e.g., detector output images per second) at which images are detected/output in a sequence by the image detector circuit 165 and provided to the logic device 110 by the readout circuit 170. The readout circuit 170 may read out the pixel values generated by the image detector circuit 165 in accordance with an integration time (e.g., also referred to as an integration period).

In various embodiments, a combination of the image detector circuit 165 and the readout circuit 170 may be, may include, or may together provide an FPA. Detectors of the image detector circuit 165 may be cooled or uncooled. In some aspects, the image detector circuit 165 may be a thermal image detector circuit that includes an array of microbolometers, and the combination of the image detector circuit 165 and the readout circuit 170 may be referred to as a microbolometer FPA. In some cases, the array of microbolometers may be arranged in rows and columns. The microbolometers may detect IR radiation and generate pixel values based on the detected IR radiation. For example, in some cases, the microbolometers may be thermal IR detectors that detect IR radiation in the form of heat energy and generate pixel values based on the amount of heat energy detected. The microbolometers may absorb incident IR radiation and produce a corresponding change in temperature in the microbolometers. The change in temperature is associated with a corresponding change in resistance of the microbolometers. With each microbolometer functioning as a pixel, a two-dimensional image or picture representation of the incident IR radiation can be generated by translating the changes in resistance of each microbolometer into a time-multiplexed electrical signal. The translation may be performed by the ROIL. The microbolometer FPA may include IR detecting materials such as amorphous silicon (a-Si), vanadium oxide ($VO_x$) a combination thereof, and/or other detecting material(s). In an aspect, for a microbolometer FPA, the integration time may be, or may be indicative of, a time interval during which the microbolometers are biased. In this case, a longer integration time may be associated with higher gain of the IR signal, but not more IR radiation being collected. The IR radiation may be collected in the form of heat energy by the microbolometers. In some cases, a microbolometer may be sensitive to at least the LWIR range.

In some cases, the image capture component 120 may include one or more optical components and/or one or more filters. The optical component(s) may include one or more windows, lenses, mirrors, beamsplitters, beam couplers, and/or other components to direct and/or focus radiation to the image detector circuit 165. The optical component(s) may include components each formed of material and appropriately arranged according to desired transmission characteristics, such as desired transmission wavelengths and/or ray transfer matrix characteristics. The filter(s) may be adapted to pass radiation of some wavelengths but substantially block radiation of other wavelengths. For example, the image capture component 120 may be an IR imaging device that includes one or more filters adapted to pass IR radiation of some wavelengths while substantially blocking IR radiation of other wavelengths (e.g., MWIR filters, thermal IR filters, and narrow-band filters). In this example, such filters may be utilized to tailor the image capture component 120 for increased sensitivity to a desired band of IR wavelengths. In an aspect, an IR imaging device may be referred to as a thermal imaging device when the IR imaging device is tailored for capturing thermal IR images. Other imaging devices, including IR imaging devices tailored for capturing infrared IR images outside the thermal range, may be referred to as non-thermal imaging devices.

In one specific, not-limiting example, the image capture component 120 may include an IR imaging sensor having an FPA of detectors responsive to IR radiation including near infrared (NIR), SWIR, MWIR, LWIR, and/or very-long wave IR (VLWIR) radiation. In some other embodiments, alternatively or in addition, the image capture component 120 may include a complementary metal oxide semiconductor (CMOS) sensor or a charge-coupled device (CCD) sensor that can be found in any consumer camera (e.g., visible light camera).

In some embodiments, the imaging system 100 includes a shutter 190. The shutter 190 may be operated to selectively inserted into an optical path between the scene 175 and the image capture component 120 to expose or block the aperture 185. In some cases, the shutter 190 may be moved (e.g., slid, rotated, etc.) manually (e.g., by a user of the imaging system 100) and/or via an actuator (e.g., controllable by the logic device 110 in response to user input or autonomously, such as an autonomous decision by the logic device 110 to perform a calibration of the imaging device 105). When the shutter 190 is outside of the optical path to expose the aperture 185, the electromagnetic radiation from the scene 175 may be received by the image detector circuit 165 (e.g., via one or more optical components and/or one or more filters). As such, the image detector circuit 165 captures images of the scene 175. The shutter 190 may be referred to as being in an open position or simply as being open. When the shutter 190 is inserted into the optical path to block the aperture 185, the electromagnetic radiation from the scene 175 is blocked from the image detector circuit 165. As such, the image detector circuit 165 captures images of the shutter 190. The shutter 190 may be referred to as being in a closed position or simply as being closed. In some cases, the shutter 190 may block the aperture 185 during a calibration process, in which the shutter 190 may be used as a uniform blackbody (e.g., a substantially uniform blackbody). In some cases, the shutter 190 may be temperature controlled to provide a temperature controlled uniform black body (e.g., to present a uniform field of radiation to the image detector circuit 165). For example, in some cases, a surface of the shutter 190 imaged by the image detector circuit 165 may be implemented by a uniform blackbody coating. In some cases, such as for an imaging device without a shutter or with a broken shutter or as an alternative to the shutter 190, a case or holster of the imaging device 105, a lens cap, a cover, a wall of a room, or other suitable object/surface may be used to provide a uniform blackbody (e.g., substantially uniform blackbody). Thus, for example, the shutter 190 may be used with the image capture component 120 to a perform a NUC process, such as a flat field correction (FFC) process set forth in U.S. patent application Ser. No. 12/391,156 filed Feb. 23, 2009, which is incorporated herein by reference in its entirety.

Other imaging sensors that may be embodied in the image capture component 120 include a photonic mixer device (PMD) imaging sensor or other time of flight (ToF) imaging sensor, LIDAR imaging device, RADAR imaging device, millimeter imaging device, positron emission tomography (PET) scanner, single photon emission computed tomography (SPECT) scanner, ultrasonic imaging device, or other imaging devices operating in particular modalities and/or spectra. It is noted that for some of these imaging sensors that are configured to capture images in particular modalities and/or spectra (e.g., infrared spectrum, etc.), they are more prone to produce images with low frequency shading, for example, when compared with a typical CMOS-based or CCD-based imaging sensors or other imaging sensors, imaging scanners, or imaging devices of different modalities.

The images, or the digital image data corresponding to the images, provided by the image capture component 120 may be associated with respective image dimensions (also referred to as pixel dimensions). An image dimension, or pixel dimension, generally refers to the number of pixels in an image, which may be expressed, for example, in width multiplied by height for two-dimensional images or otherwise appropriate for relevant dimension or shape of the image. Thus, images having a native resolution may be resized to a smaller size (e.g., having smaller pixel dimensions) in order to, for example, reduce the cost of processing and analyzing the images. Filters (e.g., a non-uniformity estimate) may be generated based on an analysis of the resized images. The filters may then be resized to the native resolution and dimensions of the images before being applied to the images.

The image interface 125 may include, in some embodiments, appropriate input ports, connectors, switches, and/or circuitry configured to interface with external devices (e.g., a remote device 155 and/or other devices) to receive images (e.g., digital image data) generated by or otherwise stored at the external devices. In an aspect, the image interface 125 may include a serial interface and telemetry line for providing metadata associated with image data. The received images or image data may be provided to the logic device 110. In this regard, the received images or image data may be converted into signals or data suitable for processing by the logic device 110. For example, in one embodiment, the image interface 125 may be configured to receive analog video data and convert it into suitable digital data to be provided to the logic device 110.

The image interface 125 may include various standard video ports, which may be connected to a video player, a video camera, or other devices capable of generating standard video signals, and may convert the received video signals into digital video/image data suitable for processing by the logic device 110. In some embodiments, the image interface 125 may also be configured to interface with and receive images (e.g., image data) from the image capture component 120. In other embodiments, the image capture component 120 may interface directly with the logic device 110.

The control component 130 includes, in one embodiment, a user input and/or an interface device, such as a rotatable knob (e.g., potentiometer), push buttons, slide bar, keyboard, and/or other devices, that is adapted to generate a user input control signal. The logic device 110 may be configured to sense control input signals from a user via the control component 130 and respond to any sensed control input signals received therefrom. The logic device 110 may be configured to interpret such a control input signal as a value, as generally understood by one skilled in the art. In one embodiment, the control component 130 may include a control unit (e.g., a wired or wireless handheld control unit) having push buttons adapted to interface with a user and receive user input control values. In one implementation, the push buttons and/or other input mechanisms of the control unit may be used to control various functions of the imaging device 105, such as calibration initiation and/or related control, shutter control, autofocus, menu enable and selection, field of view, brightness, contrast, noise filtering, image enhancement, and/or various other features.

The display component 135 includes, in one embodiment, an image display device (e.g., a liquid crystal display (LCD)) or various other types of generally known video displays or monitors. The logic device 110 may be configured to display image data and information on the display 5 component 135. The logic device 110 may be configured to retrieve image data and information from the memory component 115 and display any retrieved image data and information on the display component 135. The display component 135 may include display circuitry, which may be utilized by the logic device 110 to display image data and information. The display component 135 may be adapted to receive image data and information directly from the image capture component 120, logic device 110, and/or image interface 125, or the image data and information may be transferred from the memory component 115 via the logic device 110. In some aspects, the control component 130 may be implemented as part of the display component 135. For example, a touchscreen of the imaging device 105 may provide both the control component 130 (e.g., for receiving user input via taps and/or other gestures) and the display component 135 of the imaging device 105.

The sensing component 140 includes, in one embodiment, one or more sensors of various types, depending on the application or implementation requirements, as would be understood by one skilled in the art. Sensors of the sensing component 140 provide data and/or information to at least the logic device 110. In one aspect, the logic device 110 may be configured to communicate with the sensing component 140. In various implementations, the sensing component 140 may provide information regarding environmental conditions, such as outside temperature (e.g., ambient temperature), lighting conditions (e.g., day, night, dusk, and/or dawn), humidity level, specific weather conditions (e.g., sun, rain, and/or snow), distance (e.g., laser rangefinder or time-of-flight camera), and/or whether a tunnel or other type of enclosure has been entered or exited. The sensing component 140 may represent conventional sensors as generally known by one skilled in the art for monitoring various conditions (e.g., environmental conditions) that may have an effect (e.g., on the image appearance) on the image data provided by the image capture component 120.

In some implementations, the sensing component 140 (e.g., one or more sensors) may include devices that relay information to the logic device 110 via wired and/or wireless communication. For example, the sensing component 140 may be adapted to receive information from a satellite, through a local broadcast (e.g., radio frequency (RF)) transmission, through a mobile or cellular network and/or through information beacons in an infrastructure (e.g., a transportation or highway information beacon infrastructure), or various other wired and/or wireless techniques. In some embodiments, the logic device 110 can use the information (e.g., sensing data) retrieved from the sensing component 140 to modify a configuration of the image capture component 120 (e.g., adjusting a light sensitivity level, adjusting a direction or angle of the image capture component 120, adjusting an aperture, etc.). The sensing component 140 may include a temperature sensing component to provide temperature data (e.g., one or more measured temperature values) various components of the imaging device 105, such as the image detection circuit 165 and/or the shutter 190. By way of non-limiting examples, a temperature sensor may include a thermistor, thermocouple, thermopile, pyrometer, and/or other appropriate sensor for providing temperature data.

In some embodiments, various components of the imaging system 100 may be distributed and in communication with one another over a network 160. In this regard, the imaging device 105 may include a network interface 145 configured to facilitate wired and/or wireless communication among various components of the imaging system 100 over the network 160. In such embodiments, components may also be replicated if desired for particular applications of the imaging system 100. That is, components configured for same or similar operations may be distributed over a network. Further, all or part of any one of the various components may be implemented using appropriate components of the remote device 155 (e.g., a conventional digital video recorder (DVR), a computer configured for image processing, and/or other device) in communication with various components of the imaging system 100 via the network interface 145 over the network 160, if desired. Thus, for example, all or part of the logic device 110, all or part of the memory component 115, and/or all of part of the display component 135 may be implemented or replicated at the remote device 155. In some embodiments, the imaging system 100 may not include imaging sensors (e.g., image capture component 120), but instead receive images or image data from imaging sensors located separately and remotely from the logic device 110 and/or other components of the imaging system 100. It will be appreciated that many other combinations of distributed implementations of the imaging system 100 are possible, without departing from the scope and spirit of the disclosure.

Furthermore, in various embodiments, various components of the imaging system 100 may be combined and/or implemented or not, as desired or depending on the application or requirements. In one example, the logic device 110 may be combined with the memory component 115, image capture component 120, image interface 125, display component 135, sensing component 140, and/or network interface 145. In another example, the logic device 110 may be combined with the image capture component 120, such that certain functions of the logic device 110 are performed by circuitry (e.g., a processor, a microprocessor, a logic device, a microcontroller, etc.) within the image capture component 120. In another example, the imaging system 100 does not include the sensing component 140.

In some embodiments, the imaging system 100 may be used to detect one or more gases of interest within the scene 175. The object 180 may be a gas. The image capture component 120 may capture one or more images of the scene 175 in response to infrared radiation received from the scene 175. The infrared radiation may correspond to wavelengths that are emitted and/or absorbed by the object 180 within the scene 175, and other wavelengths that are emitted and/or absorbed by other objects within the scene 175. Examples of gas detection techniques are provided in U.S. Patent Application Publication Nos. 2019/0187019 and 2020/0116583 and U.S. Pat. No. 10,416,076, which are all incorporated by reference in their entirety.

Although the object 180 is a gas in some embodiments, the object 180 may generally be any object of interest dependent on application. As non-limiting examples, the object 180 may be a car (e.g., generally any car or a specific car), a person (e.g., generally any person or a specific person), an aerial vehicle, or generally any other object of interest dependent on application. In some aspects, the imaging system 100 may include object identification/detection capability (e.g., in the logic device 110) and/or may be coupled to a system/device having object identification/detection capability (e.g., the system/device receives image data from the imaging system 100 and performs object identification/detection on the received image data).

Figure 2:
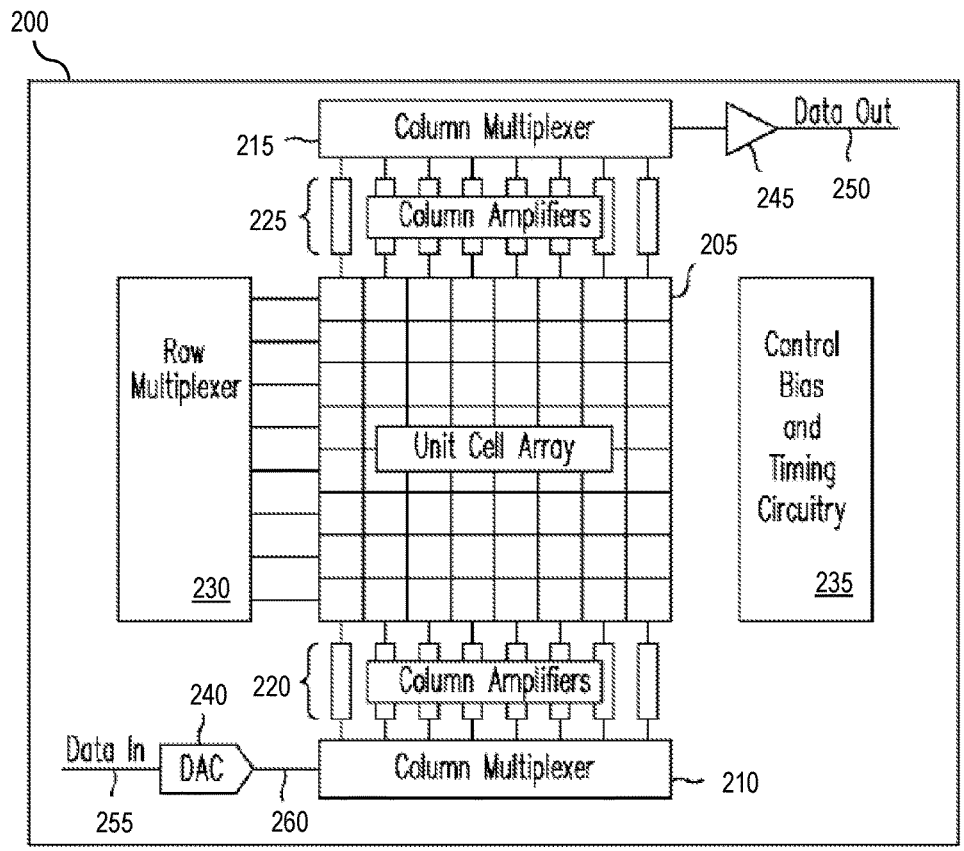
FIG. 2 illustrates a block diagram of an example image sensor assembly in accordance with one or more embodiments of the present disclosure.

FIG. 2 illustrates a block diagram of an example image sensor assembly 200 in accordance with one or more embodiments of the present disclosure. Not all of the depicted components may be required, however, and one or more embodiments may include additional components not shown in the figure. Variations in the arrangement and type of the components may be made without departing from the spirit or scope of the claims as set forth herein. Additional components, different components, and/or fewer components may be provided. In an embodiment, the image sensor assembly 200 may be an FPA, for example, implemented as the image capture component 120 of FIG. 1.

The image sensor assembly 200 includes a unit cell array 205, column multiplexers 210 and 215, column amplifiers 220 and 225, a row multiplexer 230, control bias and timing circuitry 235, a digital-to-analog converter (DAC) 240, and a data output buffer 245. In some aspects, operations of and/or pertaining to the unit cell array 205 and other components may be performed according to a system clock and/or synchronization signals (e.g., line synchronization (LSYNC) signals). The unit cell array 205 includes an array of unit cells. In an aspect, each unit cell may include a detector (e.g., a pixel) and interface circuitry. The interface circuitry of each unit cell may provide an output signal, such as an output voltage or an output current, in response to a detection signal (e.g., detection current, detection voltage) provided by the detector of the unit cell. The output signal may be indicative of the magnitude of EM radiation received by the detector and may be referred to as image pixel data or simply image data. The column multiplexer 215, column amplifiers 220, row multiplexer 230, and data output buffer 245 may be used to provide the output signals from the unit cell array 205 as a data output signal on a data output line 250. The output signals on the data output line 250 may be provided to components downstream of the image sensor assembly 200, such as processing circuitry (e.g., the logic device 110 of FIG. 1), memory (e.g., the memory component 115 of FIG. 1), display device (e.g., the display component 135 of FIG. 1), and/or other component to facilitate processing, storage, and/or display of the output signals. The data output signal may be an image formed of the pixel values for the image sensor assembly 200. In this regard, the column multiplexer 215, the column amplifiers 220, the row multiplexer 230, and the data output buffer 245 may collectively provide an ROIC (or portion thereof) of the image sensor assembly 200. In an aspect, the interface circuitry may be considered part of the ROIC, or may be considered an interface between the detectors and the ROIC. In some embodiments, components of the image sensor assembly 200 may be implemented such that the unit cell array 205 and the ROIC may be part of a single die.

The column amplifiers 225 may generally represent any column processing circuitry as appropriate for a given application (analog and/or digital), and is not limited to amplifier circuitry for analog signals. In this regard, the column amplifiers 225 may more generally be referred to as column processors in such an aspect. Signals received by the column amplifiers 225, such as analog signals on an analog bus and/or digital signals on a digital bus, may be processed according to the analog or digital nature of the signal. As an example, the column amplifiers 225 may include circuitry for processing digital signals. As another example, the column amplifiers 225 may be a path (e.g., no processing) through which digital signals from the unit cell array 205 traverses to get to the column multiplexer 215. As another example, the column amplifiers 225 may include an ADC for converting analog signals to digital signals (e.g., to obtain digital count values). These digital signals may be provided to the column multiplexer 215.

Each unit cell may receive a bias signal (e.g., bias voltage, bias current) to bias the detector of the unit cell to compensate for different response characteristics of the unit cell attributable to, for example, variations in temperature, manufacturing variances, and/or other factors. For example, the control bias and timing circuitry 235 may generate the bias signals and provide them to the unit cells. By providing appropriate bias signals to each unit cell, the unit cell array 205 may be effectively calibrated to provide accurate image data in response to light (e.g., visible-light, IR light) incident on the detectors of the unit cells. In an aspect, the control bias and timing circuitry 235 may be, may include, or may be a part of, a logic circuit.

The control bias and timing circuitry 235 may generate control signals for addressing the unit cell array 205 to allow access to and readout of image data from an addressed portion of the unit cell array 205. The unit cell array 205 may be addressed to access and readout image data from the unit cell array 205 row by row, although in other implementations the unit cell array 205 may be addressed column by column or via other manners.

The control bias and timing circuitry 235 may generate bias values and timing control voltages. In some cases, the DAC 240 may convert the bias values received as, or as part of, data input signal on a data input signal line 255 into bias signals (e.g., analog signals on analog signal line(s) 260) that may be provided to individual unit cells through the operation of the column multiplexer 210, column amplifiers 220, and row multiplexer 230. For example, the DAC 240 may drive digital control signals (e.g., provided as bits) to appropriate analog signal levels for the unit cells. In some technologies, a digital control signal of 0 or 1 may be driven to an appropriate logic low voltage level or an appropriate logic high voltage level, respectively. In another aspect, the control bias and timing circuitry 235 may generate the bias signals (e.g., analog signals) and provide the bias signals to the unit cells without utilizing the DAC 240. In this regard, some implementations do not include the DAC 240, data input signal line 255, and/or analog signal line(s) 260. In an embodiment, the control bias and timing circuitry 235 may be, may include, may be a part of, or may otherwise be coupled to the logic device 110 and/or image capture component 120 of FIG. 1.

In an embodiment, the image sensor assembly 200 may be implemented as part of an imaging device (e.g., the imaging device 105). In addition to the various components of the image sensor assembly 200, the imaging device may also include one or more processors, memories, logic, displays, interfaces, optics (e.g., lenses, mirrors, beamsplitters), and/or other components as may be appropriate in various implementations. In an aspect, the data output signal on the data output line 250 may be provided to the processors (not shown) for further processing. For example, the data output signal may be an image formed of the pixel values from the unit cells of the image sensor assembly 200. The processors may perform operations such as non-uniformity correction (e.g., flat-field correction or other calibration technique), spatial and/or temporal filtering, and/or other operations. The images (e.g., processed images) may be stored in memory (e.g., external to or local to the imaging system) and/or displayed on a display device (e.g., external to and/or integrated with the imaging system). The various components of FIG. 2 may be implemented on a single chip or multiple chips. Furthermore, while the various components are illustrated as a set of individual blocks, various of the blocks may be merged together or various blocks shown in FIG. 2 may be separated into separate blocks.

It is noted that in FIG. 2 the unit cell array 205 is depicted as an 8×8 (e.g., 8 rows and 8 columns of unit cells. However, the unit cell array 205 may be of other array sizes. By way of non-limiting examples, the unit cell array 205 may include 512×512 (e.g., 512 rows and 512 columns of unit cells), 1024×1024, 2048×2048, 4096×4096, 8192×8192, and/or other array sizes. In some cases, the array size may have a row size (e.g., number of detectors in a row) different from a column size (e.g., number of detectors in a column). Examples of frame rates may include 30 Hz, 60 Hz, and 120 Hz. In an aspect, each unit cell of the unit cell array 205 may represent a pixel.

Figure 3:
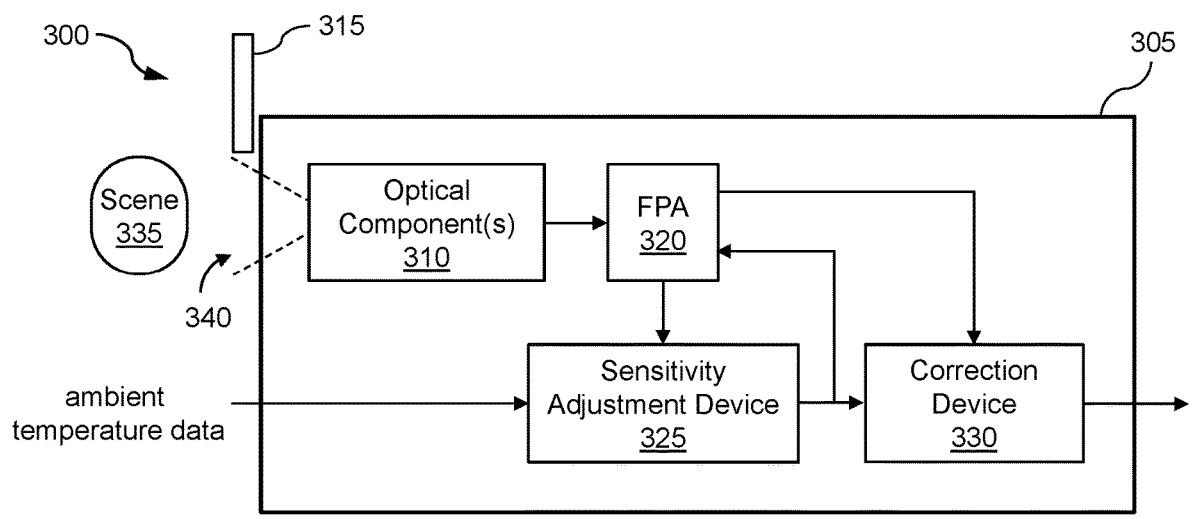
FIG. 3 illustrates an example system for providing variable sensitivity in accordance with one or more embodiments of the present disclosure.

FIG. 3 illustrates an example system 300 for providing variable sensitivity in accordance with one or more embodiments of the present disclosure. The system 300 may be, or may be a part of, an infrared imaging system used to capture and process images. In an embodiment, the infrared imaging system may be, may include, or may be a part of, the imaging system 100 of FIG. 1. Not all of the depicted components may be required, however, and one or more embodiments may include additional components not shown in the figure. Variations in the arrangement and type of the components may be made without departing from the spirit or scope of the claims as set forth herein. Additional components, different components, and/or fewer components may be provided.

The system 300 includes a housing 305 (e.g., a camera body), one or more optical components 310, a shutter 315, an FPA 320, and a sensitivity adjustment device 325, and a correction device 330 (e.g., also referred to as an image correction device). In an embodiment, the optical component(s) 310, the shutter 315, the FPA 320, the sensitivity adjustment device 325, and/or the correction device 330 may be implemented using one or more processing circuits on a single chip or distributed across two or more chips.

The housing 305 may house the optical component(s) 310, the shutter 315, the FPA 320, the sensitivity adjustment device 325, and/or the correction device 330. Although the optical component(s) 310, the FPA 320, the sensitivity adjustment device 325, and the correction device 330 are disposed within the housing 305 in FIG. 3, fewer, more, and/or different components may be disposed within the housing 305. In an aspect, the housing 305 may house at least the optical component(s) 310 and the FPA 320. The shutter 315, the sensitivity adjustment device 325, and/or the correction device 330 may be disposed within the housing 305 or external to the housing 305.

The optical component(s) 310 may receive electromagnetic radiation from a scene 335 through an aperture 340 of the system 300 and pass the electromagnetic radiation to the FPA 320. For example, the optical component(s) 310 may direct and/or focus electromagnetic radiation on the FPA 320. The optical component(s) 310 may include one or more windows, lenses, mirrors, beamsplitters, beam couplers, and/or other components. The optical component(s) 310 may include components each formed of material and appropriately arranged according to desired transmission characteristics, such as desired transmission wavelengths and/or ray transfer matrix characteristics.

The shutter 315 may be operated to selectively expose or block the aperture 340. When the shutter 315 is positioned to expose the aperture 340, the electromagnetic radiation from the scene 335 may be received and directed by the optical component(s) 310. When the shutter 315 is positioned to block the aperture 340, the electromagnetic radiation from the scene 335 is blocked from the optical component(s) 310. In some cases, the shutter 315 may block the aperture 340 during a calibration process, in which the shutter 315 may be used as a uniform blackbody.

The FPA 320 includes a detector array and an ROIC. In an embodiment, the FPA 320 may be implemented by the imaging capture component 120. The FPA 320 may receive the electromagnetic radiation from the optical component(s) 310 and a sensitivity setting from the sensitivity adjustment device 325 and capture image data based on the electromagnetic radiation (e.g., infrared component of the electromagnetic radiation) and the sensitivity setting. The FPA 320 may adjust/set one or more image capturing parameters according to the sensitivity setting. In some cases, an image capturing parameter may include an integration time, an impedance characteristic associated with the FPA 320 (e.g., associated with detectors of the FPA 320), and/or a bias signal (e.g., bias voltage) applied to the FPA 320. In an aspect, the detector array is an infrared detector array (e.g., microbolometer array) that detects IR radiation (e.g., thermal IR radiation). The image data may include infrared data values (e.g., thermal infrared data values). As an example, the FPA 320 may include or may be coupled to an ADC circuit that generates infrared data values based on infrared radiation. A 16-bit ADC circuit may generate infrared data values that range from 0 to 65,535. The infrared data values may provide temperatures for different portions of the scene, such as provide temperatures of objects, persons, and/or other aspects in the scene 335.

In some cases, the infrared image data may be represented in an image according to a palette, such that a visual representation value (e.g., color value or grayscale value) of each pixel of the image is indicative of a temperature associated with that pixel. For example, a temperature associated with an object in the scene 335 may be represented in pixels (e.g., a subset of pixels) of an infrared image (e.g., a thermal infrared image) that correspond to the object. In some cases, the object in the scene 335 may be a gas of interest (e.g., dependent on application). The infrared image data may be displayed (e.g., to a user), stored, and/or processed.

The sensitivity adjustment device 325 may receive the image data (e.g., the infrared data values) generated by the FPA 320 and ambient temperature data. The sensitivity adjustment device 325 may determine a sensitivity setting (e.g., an updated sensitivity setting) based on the image data and the ambient temperature data. In an embodiment, the sensitivity adjustment device 325 may be implemented by the logic device 110.

The sensitivity setting may be, or may be indicative of, the smallest temperature difference that can be resolved by the FPA 320. The sensitivity adjustment device 325 may provide the sensitivity setting to the FPA 320 (e.g., to cause the FPA 320 to adjust one or more parameters associated with image capture) and the correction device 330 (e.g., to cause the correction device 330 to adjust one or more correction terms). In some cases, the sensitivity adjustment device 325 may selectively provide the sensitivity setting. For example, the sensitivity adjustment device 325 may provide an updated sensitivity setting if the updated sensitivity setting differs from a current sensitivity setting by more than a predetermined threshold (e.g., differs by more than 5%) and otherwise maintain the current sensitivity setting if the updated sensitivity setting does not differ from the current sensitivity setting by more than the predetermined threshold. Maintaining the current sensitivity setting when the updated sensitivity setting does not sufficiently deviate from the current sensitivity setting may reduce computation power used by (e.g., extend battery life of) the correction device 330 and/or prevent frequent changes in captured images (e.g., displayed to the user) resulting from frequent sensitivity adjustment for a substantially constant scene.

In an aspect, the sensitivity adjustment device 325 may determine scene temperature data based on the image data and then determine the sensitivity setting based on the scene temperature data and the ambient temperature data. The scene temperature data may be, may include, or may be indicative of a range of temperatures exhibited in the scene 335. The scene temperature data may be determined by the sensitivity adjustment device 325 based on the pixel values from the FPA 320 and a correlation between the pixel values and temperatures. In this regard, the scene temperature data is indicative of a temperature of objects/features in the scene 335.

The ambient temperature data may be, may include, or may be indicative of an ambient temperature (e.g., external temperature, air temperature) surrounding the system 300. In an aspect, a temperature of detectors of the FPA 320 follow the ambient temperature surrounding the system 300. As an example, the detectors may be microbolometers that have a bolometer temperature (e.g., also referred to as a substrate temperature) that follows the ambient temperature. As such, in such an aspect, the ambient temperature data may be, may include, or may be indicative of the ambient temperature surrounding the system 300 and/or the detector temperature associated with the detectors of the FPA 320. The ambient temperature data may be measured using a temperature sensor(s) external to the system 300 that may then provide the measured temperature data to the system 300 and/or measured using a temperature sensor(s) of the system 300.

The correction device 330 may receive the sensitivity setting from the sensitivity adjustment device 325, generate one or more correction maps/terms based on the sensitivity setting, and apply the correction map(s)/term(s) to the image data. In an embodiment, the correction device 330 may be implemented by the logic device 110. By way of non-limiting examples, the correction map(s)/term(s) may include non-uniformity correction maps/terms and temperature stability correction maps/terms. In some cases, the temperature stability correction maps/terms may be used to account for the change of offset level of the detector, change of sensitivity of the detector, and/or out of scene radiation (e.g., self-radiation) from the camera body itself of the system 300 when the ambient temperature changes.

Figure 4:
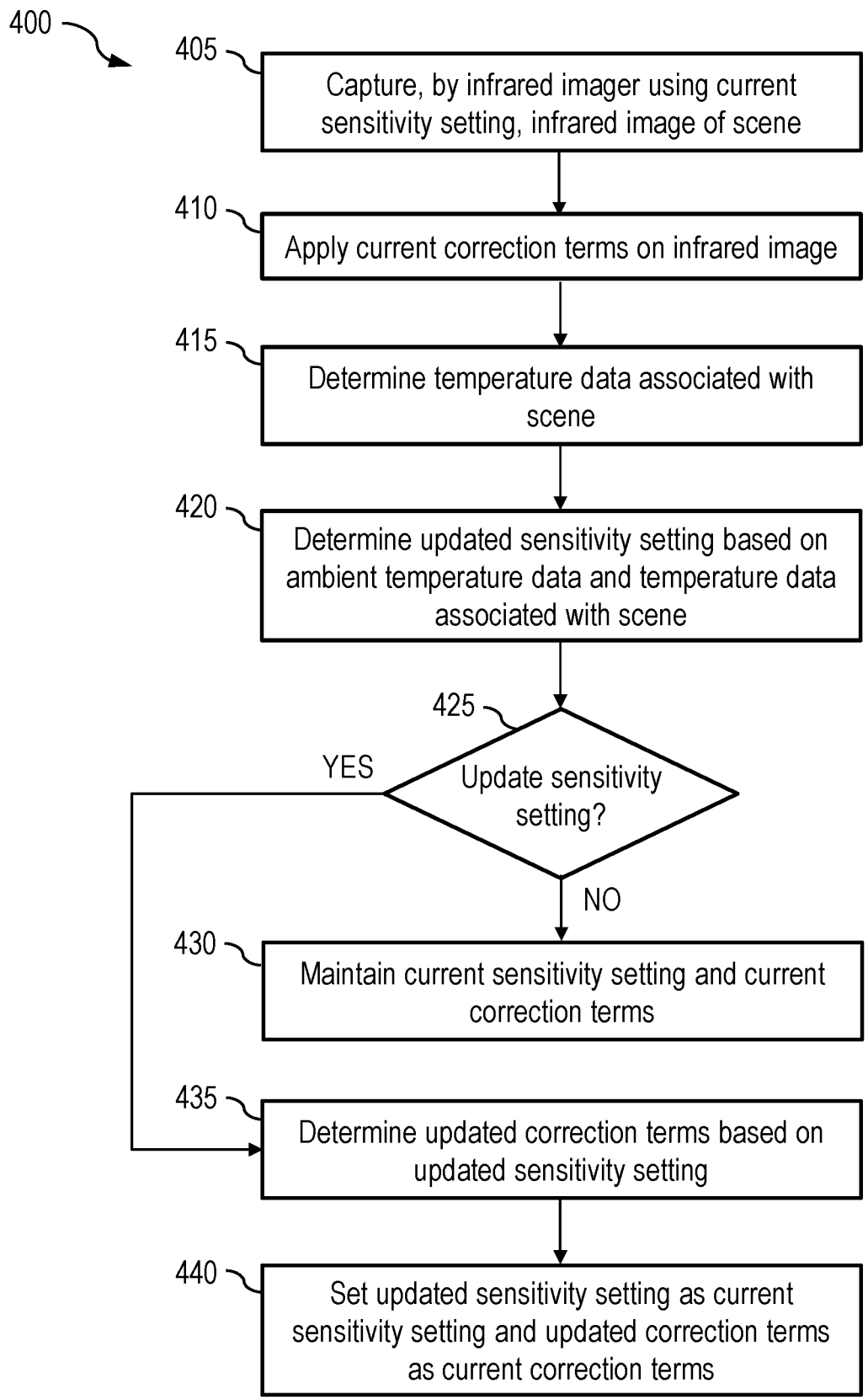
FIG. 4 illustrates a flow diagram of an example process for providing variable sensitivity in accordance with one or more embodiments of the present disclosure.

FIG. 4 illustrates a flow diagram of an example process 400 for providing variable sensitivity in accordance with one or more embodiments of the present disclosure. Although the process 400 is primarily described herein with reference to the system 300 of FIG. 3 for explanatory purposes, the process 400 can be performed in relation to other systems for providing variable sensitivity. Note that one or more operations in FIG. 4 may be combined, omitted, and/or performed in a different order as desired.

At block 405, the FPA 320 captures an image (e.g., a thermal infrared image) of the scene 335. The FPA 320 may capture the image according to a current sensitivity setting. The sensitivity setting may be effectuated by setting image capture parameters. Image capture parameters are generally dependent on detector technology. For example, the sensitivity setting may be effectuated by setting an integration time associated with the FPA 320 and/or electrical properties associated with the FPA 320. The electrical properties associated with the FPA 320 may include a capacitance associated with detectors of the FPA 320, a bias voltage applied to the detectors of the FPA 320, and/or other properties. In some cases, the bias voltage may be generated by the control bias and timing circuitry 235.

The FPA 320 may capture the image by capturing radiation (e.g., infrared radiation) from the scene 335 and generating the image (e.g., infrared image) in response to the radiation. In some cases, to reach the FPA 320, the radiation (e.g., from the scene 335) may propagate through an optical path of the infrared imaging system formed of one or more of the optical component(s) 310. In some cases, the FPA 320 and/or circuitry coupled to the FPA 320 may convert the radiation into electrical signals (e.g., voltages, currents, etc.) and generate image data based on the electrical signals. The image data may include pixel values. The pixel value of a pixel may be indicative of a temperature associated with the pixel. The pixel values may be represented in terms of digital count values generated based on the electrical signals obtained from converting the captured radiation. For example, in a case that the FPA 320 includes or is otherwise coupled to an ADC circuit, the ADC circuit may generate digital count values based on the electrical signals. For an ADC circuit that can represent an electrical signal using 14 bits, the digital count value may range from 0 to 16,383. In some cases, the FPA 320 may represent the image data in an image according to a palette. A given pixel of the image may have a visual representation value (e.g., a color value or a grayscale value) indicative of a temperature of the pixel.

At block 410, the correction device 330 applies correction maps/terms associated with the current sensitivity setting to the image received from the FPA 320 to obtain/generate a corrected image. These correction maps/terms may be referred to as current correction maps/terms. The correction maps/terms may include non-uniformity correction maps/terms (e.g., gain correction maps/terms, offset correction maps/terms) and/or temperature stability maps/terms. In some cases, the corrected image may be provided by the system 300 for storage, display (e.g., for viewing by the user), and/or further processing.

At block 415, the sensitivity adjustment device 325 determines temperature data associated with the scene 335 of the image received from the FPA 320. The temperature data associated with the scene 335 may be referred to as scene temperature data or simply scene temperature. The temperature data associated with the scene 335 may include a temperature of each pixel of the image. In this regard, a temperature associated with an object in the scene 335 may be represented in pixels of the image formed of the image data that correspond to the object. In some cases, the temperature data associated with the scene 335 may be, or may be indicative of, a range of temperatures present in the scene 335. In some cases, the temperature data associated with the scene 335 may be based on a histogram distribution that indicates a number of pixels of the image that has a temperature falling within each temperature bin (e.g., with a temperature range associated with each temperature bin).

At block 420, the sensitivity adjustment device 325 determines an updated sensitivity setting based on ambient temperature data associated with the FPA 320 and the temperature data associated with the scene 335. The ambient temperature data may be, may include, or may be indicative of an ambient temperature (e.g., external temperature, air temperature) surrounding the system 300. In an aspect, a temperature of detectors of the FPA 320 follows the ambient temperature surrounding the system 300. As an example, the detectors may be microbolometers that have a bolometer temperature (e.g., also referred to as a substrate temperature) that follows the ambient temperature. In this example, the ambient temperature data may be, may include, or may be indicative of the bolometer temperature.

At block 425, the sensitivity adjustment device 325 determines whether to update (e.g., replace) the current sensitivity setting associated with the FPA 320 with the updated sensitivity setting determined at block 420. For example, the sensitivity adjustment device 325 may determine to update the current sensitivity setting if the updated sensitivity setting differs from a current sensitivity setting by more than a predetermined threshold (e.g., differs by more than 10%) and otherwise maintain the current sensitivity setting (e.g., not update/replace the current sensitivity setting with the updated sensitivity setting).

If the determination at block 425 is to not update the current sensitivity setting with the updated sensitivity setting, the process 400 proceeds to block 430. At block 430, the sensitivity adjustment device 325 maintains the current sensitivity setting. Since the current sensitivity setting are maintained, at block 430, the sensitivity adjustment device 325 also maintains the current correction maps/terms. In an embodiment, the process 400 may be repeated for a next image captured by the FPA 320 using the current sensitivity setting (e.g., the same sensitivity setting used for the current image at block 405) and the current correction maps/terms.

If the determination at block 425 is to update the current sensitivity setting with the updated sensitivity setting, the process 400 proceeds to block 435. At block 435, the correction device 330 determines updated correction maps/terms based on the updated sensitivity setting. The updated correction maps/terms may include updated non-uniformity correction maps/terms (e.g., updated gain correction maps/terms, updated offset correction maps/terms) and/or updated temperature stability maps/terms. In some cases, the correction device 330 may determine the updated correction maps/terms by adjusting correction maps/terms determined from a calibration process and stored (e.g., in non-volatile memory of the system 300). Such a calibration process may be a factory calibration performed prior to deployment to a customer or an in-the-field calibration performed by the customer. As an example, the correction device 330 may adjust stored calibrated correction maps/terms based on the sensitivity setting, the ambient temperature data, and/or the temperature data associated with the scene 335. At block 440, the sensitivity adjustment device 325 sets the updated sensitivity setting as the current sensitivity setting and the correction device 330 sets the updated correction maps/terms as current correction maps/terms. In an embodiment, the process 400 may be repeated for a next image captured by the FPA 320 using the current sensitivity setting (e.g., now set to the updated sensitivity setting determined based on the current image at block 420) and the current correction maps/terms (e.g., now set to the updated correction maps/terms determined at block 435).

The process 400 may be performed continuously (e.g., in substantially real-time), periodically (e.g., set by a user or a manufacturer of the system 300), in response to a trigger event (e.g., upon detection of a new high temperature object and/or new low temperature object), and/or other triggers. In some aspects, blocks 420 and 425 may be optional. In such aspects, the process 400 may update the sensitivity setting and corresponding correction maps/terms whenever the sensitivity setting and the corresponding correction terms do not match the currently used sensitivity setting and correction terms.

Thus, using various embodiments, the system 300 may deliver sensitivity for any given scene/object temperature and ambient temperature while maintaining radiometric performance. The sensitivity may be continuously or discretely adjusted responsive to temperature changes in the scene (e.g., new object enters the scene) and/or changes in the ambient temperature. With the sensitivity adjusted, the system 300 may determine (e.g., recalculate, replace, and/or update) the associated maps and temperature stability correction terms to maintain high image quality and temperature measurement accuracy. The system 300 or its user may determine/choose which image capture parameters (e.g., integration time, capacitance, and/or bias voltage) the sensitivity/response is tuned with. In this regard, such parameters affect sensitivity and may be set (e.g., freely set) to achieve a desired sensitivity (e.g., freely set sensitivity).

As a first example, a scene may remain constant over time whereas an operation ambient temperature may vary over time. The scene may include temperatures ranging from around −20° C. to around 120° C. and a detector may be used in an uncooled camera with the operation ambient temperature of around −20° C. to around 50° C. For a certain set of image capture parameters (e.g., a particular combination of integration time, detector capacitance, and/or bias voltage), the uncooled camera is two times more sensitive at an ambient temperature of −20° C. than at an ambient temperature of 50° C. In this regard, if a set of image capturing parameters (e.g., integration time, detector capacitance, and/or bias voltage) of the detector is applied to achieve a maximum sensitivity at an ambient temperature of −20° C., the sensitivity of the detector at an ambient temperature of 50° C. with the set of image capturing parameters applied may be two times less than 5 the sensitivity of the detector at the ambient temperature of −20° C. with the same set of image capturing parameters applied. If a set of image capturing parameters of the detector is set to achieve a maximum sensitivity at an ambient temperature of 50° C., the detector may saturate towards the scene having the temperatures ranging from around −20° C. to around 120° C. when the ambient temperature is −20° C. To facilitate image capture of the scene having temperatures ranging from around −20° C. to around 120° C. and the operation ambient temperature of around −20° C. to around 50° C., the sensitivity setting may be adjusted continuously or discretely adjusted based on the ambient temperature. For an ambient temperature of 50° C., the image capturing parameter(s) may be adjusted to adjust the sensitivity proportionally with the sensitivity reduction due of the ambient temperature of 50° C. relative to the ambient temperature of −20° C. As such, in some cases, by appropriately adjusting the image capturing parameter(s), the detectors of the infrared imaging system may be substantially equal in sensitivity at the ambient temperature of 50° C. as at −20° C. In some cases, to facilitate accurate temperature measurements using images captured by the image sensor device, the infrared imaging system accounts for changes in the sensitivity to determine an object temperature that is independent of an ambient temperature. With the sensitivity adjusted, the correction maps and/or temperature stability correction terms may be maintained or recalculated as appropriate.

As a second example, an ambient temperature of a detector may remain constant/steady at 20° C. and temperatures of a scene may range from −20° C. to around 120° C. The infrared imaging system may adjust image capturing parameters to maximize sensitivity. The detector sensitivity may be adjusted to achieve maximum sensitivity based on the scene temperature (e.g., the temperature of the objects in the scene). If the scene includes objects between −20° C. and 10° C. for example, the image capturing parameters may be maintained to achieve the sensitivity until the scene changes. If an object that is 60° C. enters the scene, the image capturing parameter(s) may be adjusted to allow a decrease in the sensitivity to provide a dynamic range appropriate for image capture of the 60° C. object as well as the −20° C. object. In this example, the sensitivity setting may be adjusted continuously or discretely adjusted based on changes in the scene temperature. In some cases, to facilitate accurate temperature measurements using images captured by the image sensor device, the infrared imaging system accounts for changes in the sensitivity to determine an object temperature that is independent of an ambient temperature. With the sensitivity adjusted, the correction maps and/or temperature stability correction terms may be maintained or recalculated as appropriate.

As a third example, an ambient temperature and a scene temperature may vary. The infrared imaging system may adjust parameters to maximize sensitivity to accommodate a scene ranging from −20° C. and 120° C. while the ambient temperature varies. The detector sensitivity may be adjusted to achieve maximum sensitivity based on the scene temperature and the ambient temperature. In this example, the sensitivity setting may be adjusted continuously or discretely based on the scene temperature and the ambient temperature to yield maximum sensitivity given the scene temperature and the ambient temperature conditions. In some cases, to facilitate accurate temperature measurements using images captured by the image sensor device, the infrared imaging system accounts for changes in the sensitivity to determine an object temperature that is independent of an ambient temperature. With the sensitivity adjusted, the correction maps and/or temperature stability correction terms may be maintained or recalculated as appropriate.

As a fourth example, a temperature range (e.g., scene temperature range) may be a user-specified range that is static in time. If the user knows that the scene will vary but the user desires to keep the sensitivity/response constant, the user may set a range independent of the scene at the time.

As a fifth example, the infrared imaging system may detect an object of interest. The sensitivity setting may be adjusted to provide a maximum contrast possible (e.g., based on sensor/substrate temperature) at the object temperature. In this regard, the temperature range may be set to match the object temperature. In some embodiments, such sensitivity setting adjustment may be used in thermal security cameras.

In some embodiments, the system 300 may be used to provide variable sensitivity to facilitate optical gas imaging. The scene 335 may include one or more gases of interest. The sensitivity adjustment device 325 may receive an infrared image from the FPA 320 and receive an indication associated with at least a portion of the infrared image. The portion of the infrared image may be a portion that encompasses a gas. In some cases, the indication may be an indication provided by the user of the system 300. In some cases, the indication may be based on gas detection (e.g., performed by the sensitivity adjustment device 325 and/or other device having appropriate gas detection logic). The sensitivity adjustment device 325 may determine (e.g., extract) a temperature of the gas in the portion of the infrared image and determine a temperature range for the portion of the infrared image based on the determined temperature of the gas. The sensitivity adjustment device 325 may determine a sensitivity (e.g., maximum sensitivity) that can be achieved for the temperature range. One or more image capturing parameters (e.g., integration time, capacitance, bias voltage) may be determined.

For a subsequent infrared image, the portion of the infrared image may include image data captured based on the image capturing parameter(s) to achieve the desired sensitivity for facilitating gas detection, visualization, and/or analysis. In this regard, the FPA 320 may capture a next infrared image such that pixels corresponding to the portion of the infrared image may be captured according to image capturing parameters (e.g., integration time, capacitance, bias voltage) to have the temperature range and allows the gas to be captured with high sensitivity. In some cases, when different portions (e.g., separate, non-continuous portions) of the infrared image may encompass a gas, the sensitivity adjustment device 325 may receive a respective indication associated with each of the portions. In some cases, when the temperature range is sufficient to cover the entire infrared image (e.g., the entire scene), a single infrared image may be captured according to a single set of image capture parameters (e.g., the system 300 does not capture multiple images and generate a composite image).

Figure 5:
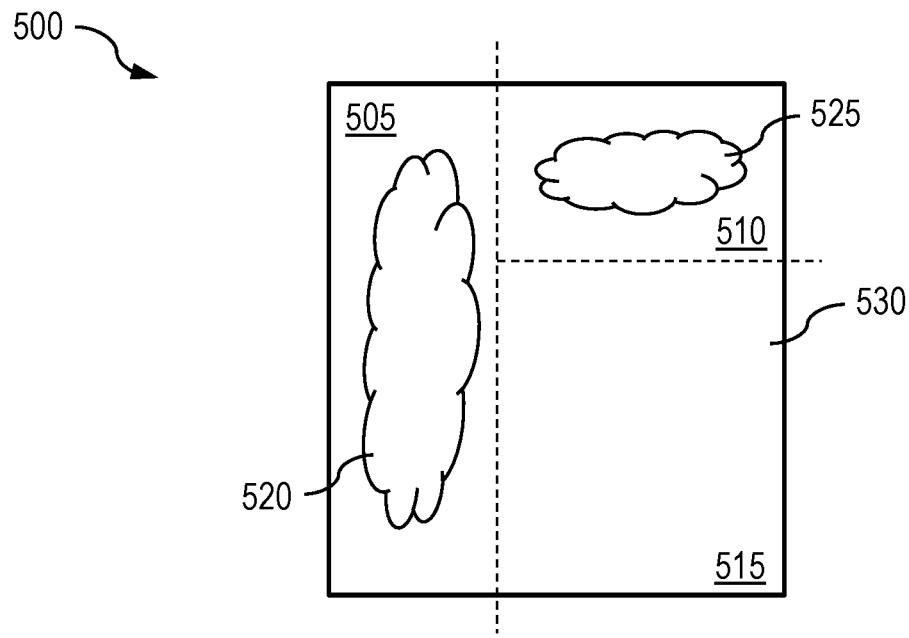
FIG. 5 illustrates an example composite image in accordance with one or more embodiments of the present disclosure.

As an example, FIG. 5 illustrates a composite image 500 having a portion 505, a portion 510, and a portion 515. The composite image 500 may be generated (e.g., by the logic device 110) based on a first image associated with a first temperature range, a second image associated with a second temperature range, and a third image associated with a third temperature range. The first temperature range may be used to provide a high sensitivity for capturing a gas 520. The second temperature range may be used to provide a high sensitivity for capturing a gas 525. The third temperature range may be used to provide a high sensitivity for capturing a portion 530 of the scene 335. In some cases, the composite image 500 may be generated based on one or more weighted averages of the first image, the second image, and the third image. As an example, the portion 505 of the composite image 500 may be generated by applying a highest weight to pixel values of pixels of the first image corresponding to the portion 505, the portion 510 of the composite image 500 may be generated by applying a highest weight to pixel values of pixels of the second image corresponding to the portion 510, and the portion 515 of the composite image 500 may be generated by applying a highest weight to pixel values of pixels of the third image corresponding to the portion 515. In some cases, a weight of zero may be used. For example, the portion 505 of the composite image 500 may be generated by using pixel values of pixels of the first image corresponding to the portion 505, while ignoring (e.g., setting a weight to zero) pixel values of pixels of the second and third images corresponding to the portion 505.

Figure 6:
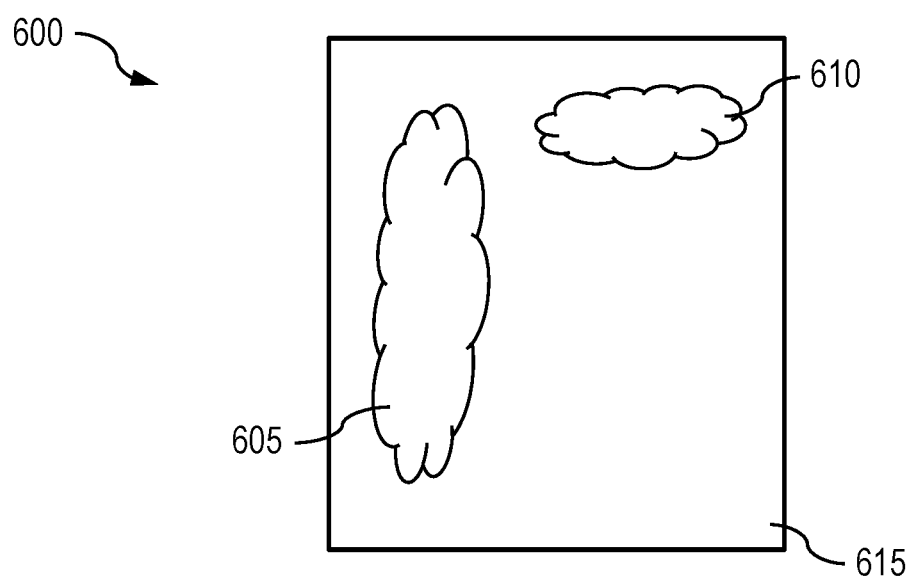
FIG. 6 illustrates an example image captured by an imager in accordance with one or more embodiments of the present disclosure.

As another example, FIG. 6 illustrates an image 600 captured by the FPA 320 based on a single temperature range. In this regard, gases 605 and 610 and a remaining portion 615 of the scene 335 may be captured within the same temperature range (e.g., using the same image capturing parameters). Although FIGS. 5 and 6 are described with reference to gases in the scene 335, objects in the scene 335 may include, alternatively or in addition to gases, other objects of interest dependent on application.

Figure 7:
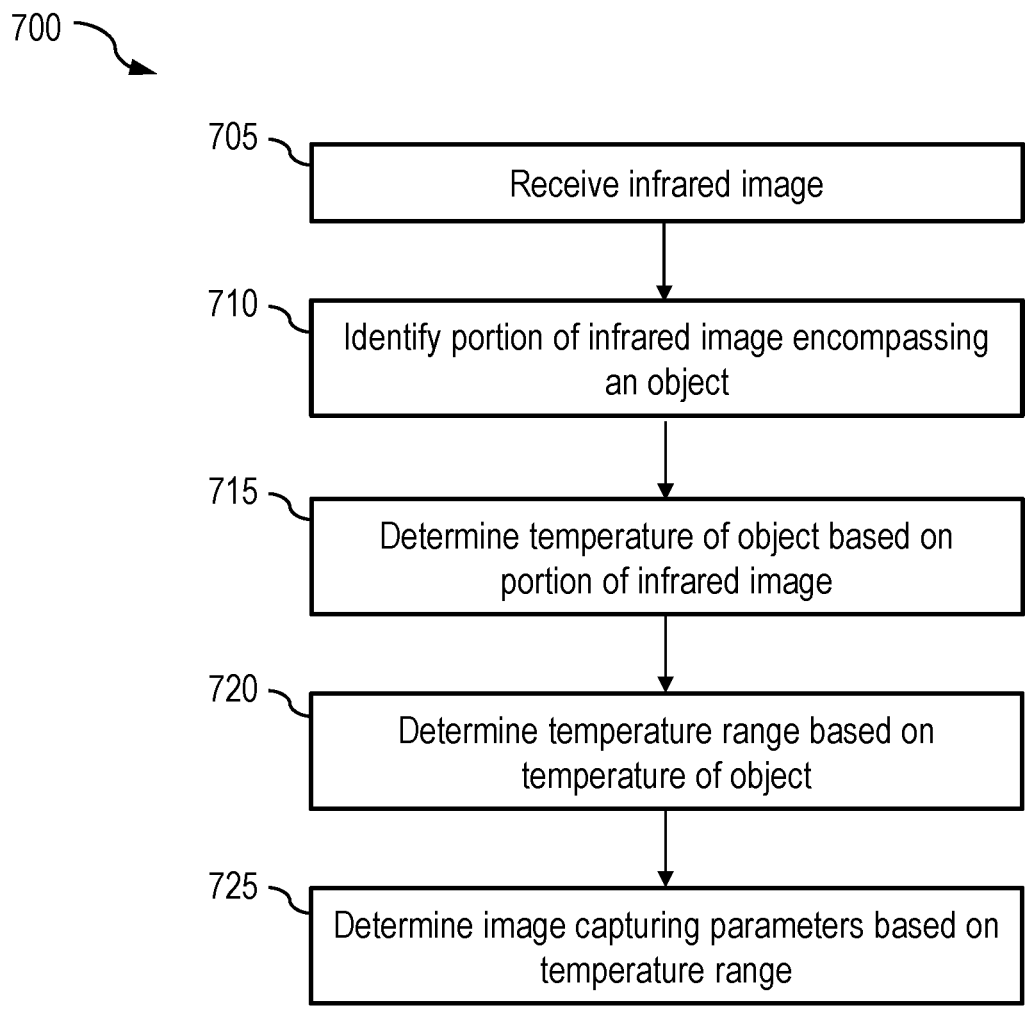
FIG. 7 illustrates a flow diagram of an example process for providing variable sensitivity for optical gas imaging in accordance with one or more embodiments of the present disclosure.

FIG. 7 illustrates a flow diagram of an example process 700 for providing variable sensitivity for optical gas imaging in accordance with one or more embodiments of the present disclosure. Although the process 700 is primarily described herein with reference to the system 300 of FIG. 3 for explanatory purposes, the process 700 can be performed in relation to other systems for providing variable sensitivity. Note that one or more operations in FIG. 7 may be combined, omitted, and/or performed in a different order as desired.

At block 705, the sensitivity adjustment device 325 receives an infrared image (e.g., a thermal infrared image). In some cases, the infrared image is received from the FPA 320. At block 710, the sensitivity adjustment device 325 identifies a portion of the infrared image encompassing an object of interest. The object of interest may be a gas in some applications. In an aspect, the portion of the infrared image may be identified based on an indication. In some cases, the indication may be an indication provided by the user of the system 300 to indicate a location in the infrared image that may have a gas leak. For example, the infrared image may be displayed to the user on a display and the user may provide user input (e.g., touch input on a touchscreen, clicking on a portion of the displayed image using a mouse) to indicate a location of a potential gas leak. In some cases, the indication may be based on gas detection (e.g., performed by the sensitivity adjustment device 325 and/or other device having appropriate gas detection logic). At block 715, the sensitivity adjustment device 325 determines a temperature of the object based on the portion of the infrared image. The temperature of the object may be provided in pixels (e.g., a subset of pixels) of the infrared image (e.g., a thermal infrared image) that correspond to the object.

At block 720, the sensitivity adjustment device 325 determines a temperature range (e.g., a dynamic range) based on the temperature of the object. The temperature range may be set to provide contrast between the object and features with other temperatures in the scene 335 to help resolve the object in the scene 335. In some cases, the user may manually set the temperature range or adjust the temperature range determined by the sensitivity adjustment device 325. At block 725, the sensitivity adjustment device 325 determines image capture parameters (e.g., integration time, capacitance, bias voltage) associated with the temperature range. The sensitivity adjustment device 325 may determine the image capture parameters appropriate to provide a high sensitivity for the temperature range.

In some aspects, one or more additional portions of the infrared image may be identified. A temperature range (e.g., dynamic range) may be determined for each additional portion and an associated image capture parameter(s) determined for each temperature range. The FPA 320 may capture an image for each of the portions according to a respective set of image capture parameters and generate a composite image based on the captured images. In some cases, each image used to generate the composite image may be captured with a respective integration time. It is noted that a frame rate generally decreases proportionally with the number of images to be captured (e.g., the number of different integration times used). For example, if the frame rate is 60 Hz and two integration times are used (e.g., two images per composite image), the resulting composite frame rate is 30 Hz.

As an example, the user may use the range 70° C. to 120° C. and find (e.g., through visual inspection or machine inspection) a faint gas leak in an image provided on a display. Within the display, the user may mark the gas. The apparent gas temperature may be estimated to be around 90° C. based on the image (e.g., pixel values of the image). A new integration time may give a range (e.g., a temperature/dynamic range) between 50° C. and 95° C. and provide a high sensitivity for this range when capturing the gas in a subsequent image. The range may be determined by the imaging system. In some cases, the user may manually set the range or adjust the range provided by the imaging system. The range may be set to provide contrast between the gas and features with other temperatures in the image to help resolve the gas in the scene. Parts of the image may be 110° C. A new integration time may give a range (e.g., a temperature/dynamic range) between 65° C. and 115° C. and provide a high sensitivity for this range when capturing these remaining parts of the image in a subsequent image. Thus, in order to encompass the full image, the infrared imaging system determine an integration time corresponding to 50° C. to 95° C. and an integration time corresponding to 65° C. and 115° C. A first image may be captured using the integration time corresponding to 50° C. to 95° C. A second image may be captured (e.g., before or after capturing the first image) using the integration time corresponding to 65° C. and 115° C. These temperature ranges (e.g., dynamic ranges) may be set to capture most, if not all, temperature values present in a scene while achieving desired sensitivities. In this regard, such temperature ranges may allow for gas visibility as well as spatial awareness. A composite image may be created by combining the first and second images.

In some cases, different palettes may be applied to different parts of the composite image. As an example, for the pixels that stem from the integration time chosen to best visualize the gas (e.g., the integration time corresponding to 50° C. to 95° C.), a high contrast palette (e.g., rainbow HC) may be applied to the pixels. For the rest of the image that stem from using the integration time for capturing spatial awareness (e.g., the integration time corresponding to 65° C. and 115° C.), a more subdued palette (e.g., grayscale) may be applied. Such a combination of palettes may allow the gas to stand out to the user. In general, such visualization enhancement using different palettes would not generally be beneficial for machine vision which determines the gas information present in the composite image before applying colorization.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

The foregoing description is not intended to limit the present disclosure to the precise forms or particular fields of use disclosed. Embodiments described above illustrate but do not limit the invention. It is contemplated that various alternate embodiments and/or modifications to the present invention, whether explicitly described or implied herein, are possible in light of the disclosure. Accordingly, the scope of the invention is defined only by the following claims.

What is claimed is:

1. A method comprising
   determining a first temperature associated with a scene based on a first infrared image of the scene;
   determining a first sensitivity setting based on a first ambient temperature associated with an infrared imager and the first temperature associated with the scene; and
   capturing, by the infrared imager, a second infrared image of the scene using the first sensitivity setting.

2. The method of claim 1, further comprising:
   determining a second temperature associated with the scene based on the second infrared image;
   determining a second ambient temperature associated with the infrared imager;
   determining a second sensitivity setting based on the second ambient temperature and the second temperature associated with the scene;

selectively setting the infrared imager to the second sensitivity setting based on a threshold; and capturing, by the infrared imager, a third infrared image of the scene using the first sensitivity setting or the second sensitivity setting.

3. The method of claim 1, further comprising:

capturing, by the infrared imager using a second sensitivity setting, the first infrared image of the scene; and applying a first correction term associated with the second sensitivity setting to the first infrared image to obtain a first corrected infrared image.

4. The method of claim 3, further comprising:

determining a second correction term based on the first sensitivity setting; and applying the second correction term to the second infrared image to obtain a second corrected infrared image.

5. The method of claim 3, wherein the second sensitivity setting is associated with a lower sensitivity than the first sensitivity setting.

6. The method of claim 1, further comprising adjusting the infrared imager based on the first sensitivity setting.

7. The method of claim 6, wherein the adjusting comprises adjusting an integration time associated with the infrared imager, a capacitance associated with the infrared imager, and/or a bias voltage associated with the infrared imager.

8. The method of claim 1, further comprising:

identifying a first portion of the second infrared image encompassing an object;

determining a temperature of the object based on the first portion of the second infrared image;

determining a first set of image capture parameters based on the temperature of the object; and capturing, by the infrared imager, a third infrared image of the scene using the first set of image capture parameters.

9. The method of claim 8, further comprising determining a first temperature range based on the determined temperature of the object, wherein the first set of image capture parameters is further based on the first temperature range.

10. The method of claim 9, further comprising:

determining a second temperature range based on a second portion of the second infrared image;

determining a second set of image capture parameters based on the second temperature range;

capturing, by the infrared imager, a fourth infrared image of the scene using the second set of image capture parameters; and generating a composite image based at least on the third infrared image and the fourth infrared image.

11. An infrared imaging system comprising:

an infrared imager configured to capture a first infrared image of a scene using a first sensitivity setting; and a logic device configured to:

determine a first temperature associated with the scene based on a second infrared image of the scene; and determine the first sensitivity setting based on a first ambient temperature associated with the infrared imager and the first temperature associated with the scene.

12. The infrared imaging system of claim 11, wherein:

the infrared imager is further configured to capture a third infrared image of the scene using the first sensitivity setting or a second sensitivity setting; and the logic device is further configured to:

determine a second temperature associated with the scene based on the first infrared image;

determine a second ambient temperature associated with the infrared imager;

determine the second sensitivity setting based on the second ambient temperature and the second temperature associated with the scene; and selectively set the infrared imager to the second sensitivity setting based on a threshold.

13. The infrared imaging system of claim 11, wherein:

the infrared imager is further configured to capture the second infrared image of the scene using a second sensitivity setting; and the logic device is further configured to apply a first correction term associated with the second sensitivity setting to the first infrared image to obtain a first corrected infrared image.

14. The infrared imaging system of claim 13, wherein the logic device is further configured to:

determine a second correction term based on the first sensitivity setting; and apply the second correction term to the first infrared image to obtain a second corrected infrared image.

15. The infrared imaging system of claim 13, wherein the second sensitivity setting is associated with a higher sensitivity than the first sensitivity setting.

16. The infrared imaging system of claim 11, wherein the logic device is configured to cause adjustment of the infrared imager based on the first sensitivity setting, and wherein the adjustment comprises an adjustment to an integration time associated with the infrared imager, an adjustment to a capacitance associated with the infrared imager, and/or an adjustment to a bias voltage associated with the infrared imager.

17. The infrared imaging system of claim 11, wherein:

the logic device is further configured to:

identify a first portion of the first infrared image encompassing an object;

determine a temperature of the object based on the first portion of the first infrared image; and determine a first set of image capture parameters based on the temperature of the object; and the infrared imager is further configured to capture a third infrared image of the scene using the first set of image capture parameters.

18. The infrared imaging system of claim 17, wherein the logic device is further configured to determine a first temperature range based on the determined temperature of the object, and wherein the first set of image capture parameters is further based on the first temperature range.

19. The infrared imaging system of claim 18, wherein:

the infrared imager is further configured to a fourth infrared image of the scene using a second set of image capture parameters;

the logic device is further configured to:

determine a second temperature range based on a second portion of the second infrared image;

determine the second set of image capture parameters based on the second temperature range; and generate a composite image based at least on the third infrared image and the fourth infrared image.

20. The infrared imaging system of claim 11, wherein the infrared imager comprises a plurality of microbolometers.

* * * * *

UNITED STATES PATENT AND TRADEMARK OFFICE
CERTIFICATE OF CORRECTION

PATENT NO. : 12,455,193 B2
APPLICATION NO. : 17/890120
DATED : October 28, 2025
INVENTOR(S) : Tien C. Nguyen and Henning Hagman It is certified that error appears in the above-identified patent and that said Letters Patent is hereby corrected as shown below:

In the Specification

In the Detailed Description:

Column 9, Lines 4-5, change "may be radiometrically 5 calibrated" to --may be radiometrically calibrated--.

Column 10, Line 16, change "performed by the ROIL." to --performed by the ROIC.--.

Column 11, Line 36, change "U.S. patent application Ser. No." to --U.S. Patent Application No.--.

Column 12, Lines 54-55, change "on the display 5 component" to --on the display component--.

Column 22, Line 13, change "two times less than 5 the sensitivity" to --two times less than the sensitivity--.

Signed and Sealed this
Sixteenth Day of December, 2025

John A. Squires
*Director of the United States Patent and Trademark Office*